(12) United States Patent
Kuhn et al.

(10) Patent No.: US 11,458,503 B2
(45) Date of Patent: Oct. 4, 2022

(54) METHOD FOR OPERATING AN EXTRUSION SYSTEM AND EXTRUSION SYSTEM

(71) Applicant: Hilti Aktiengesellschaft, Schaan (LI)

(72) Inventors: Martin Kuhn, Germering (DE); Christian Hefele, Breitenbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/298,770

(22) PCT Filed: Nov. 25, 2019

(86) PCT No.: PCT/EP2019/082376
§ 371 (c)(1),
(2) Date: Jun. 1, 2021

(87) PCT Pub. No.: WO2020/120113
PCT Pub. Date: Jun. 18, 2020

(65) Prior Publication Data
US 2022/0032337 A1    Feb. 3, 2022

(30) Foreign Application Priority Data

Dec. 14, 2018 (EP) .................... 18212582

(51) Int. Cl.
*B05C 17/005* (2006.01)
*H04W 4/80* (2018.01)
*B05C 17/01* (2006.01)

(52) U.S. Cl.
CPC .... *B05C 17/00556* (2013.01); *B05C 17/0103* (2013.01); *H04W 4/80* (2018.02)

(58) Field of Classification Search
USPC ...................................................... 222/325
See application file for complete search history.

(56) References Cited

U.S. PATENT DOCUMENTS

| 9,239,428 B2* | 1/2016 | Christopher ........ B01F 33/5012 |
| 2003/0022128 A1 | 1/2003 | Heymann et al. |

(Continued)

FOREIGN PATENT DOCUMENTS

| DE | 10 2011 075 873 | 11/2012 |
| DE | 10 2016 213 882 | 2/2018 |

(Continued)

OTHER PUBLICATIONS

International Search Report dated Feb. 6, 2020 in PCT/EP2019/082376, with English translation, 6 pages.

(Continued)

*Primary Examiner* — Benjamin R Shaw
*Assistant Examiner* — Michael J. Melaragno
(74) *Attorney, Agent, or Firm* — Grüneberg and Myers PLLC

(57) ABSTRACT

A process for operating an extrusion system is provided. An extrusion device is provided that has at least two extrusion pistons operable with different feed ratios. The process involves storing a ratio of feed rates of the extrusion pistons in a storage device of the control device in dependence on the second signal. A least one drive device is actuated by the control device for displacing the two extrusion pistons into a start position, in which a plunger of the first extrusion piston substantially abuts the first cartridge of the cartridge device and a plunger of the second extrusion piston substantially abuts the second cartridge the cartridge device. The at least one drive device is actuated by the control device with a ratio of feed rates stored in the storage device of the control device for the extrusion pistons at user request.

10 Claims, 4 Drawing Sheets

(56) References Cited

U.S. PATENT DOCUMENTS

| | | | | |
|---|---|---|---|---|
| 2012/0097702 A1* | 4/2012 | Harre | ...................... | A61C 5/64 |
| | | | | 222/145.6 |
| 2012/0141082 A1* | 6/2012 | Sawicki | .................. | G02B 6/25 |
| | | | | 385/134 |
| 2013/0075427 A1* | 3/2013 | Christopher | ........ | B01F 35/2207 |
| | | | | 222/145.5 |
| 2014/0209630 A1 | 7/2014 | O'Leary et al. | | |
| 2018/0185117 A1 | 7/2018 | Goerge et al. | | |
| 2022/0032337 A1* | 2/2022 | Kuhn | ...................... | H04W 4/80 |
| 2022/0048064 A1* | 2/2022 | Kuhn | ............... | B05C 17/00553 |

FOREIGN PATENT DOCUMENTS

| | | | | |
|---|---|---|---|---|
| WO | WO-2013092324 A1 * | 6/2013 | ............... | A61C 5/64 |
| WO | WO-2013092334 A1 * | 6/2013 | ............... | A61C 5/64 |
| WO | WO-2013092927 A1 * | 6/2013 | ............... | A61C 5/64 |
| WO | WO-2020120113 A1 * | 6/2020 | ....... | B05C 17/00556 |
| WO | WO-2020260334 A1 * | 12/2020 | .......... | B01F 13/0023 |

OTHER PUBLICATIONS

Written Opinion dated Feb. 6, 2020 in PCT/EP2019/082376, with English translation, 10 pages.

\* cited by examiner

METHOD FOR OPERATING AN EXTRUSION SYSTEM AND EXTRUSION SYSTEM

CROSS-REFERENCE TO RELATED APPLICATIONS

This application is the National Stage entry under § 371 of International Application No. PCT/EP2019/082376, filed on Nov. 25, 2019, and which claims the benefit of European Application No. 18212582.3, filed on Dec. 14, 2018. The content of each of these applications is hereby incorporated by reference in its entirety.

BACKGROUND OF THE INVENTION

Field of the Invention

The invention relates to a method for operating an extrusion device comprising an extrusion device and a cartridge device according to the preamble of claim 1. Furthermore, the invention relates to an extrusion system for performing such a method according to the subject matter of claim 7.

Description of Related Art

Extrusion units are used for example in the construction sector for extruding silicone or other liquid or viscous building materials from cartridge devices. There are also known extrusion devices, which are designed for receiving cartridge devices having two chambers. Such cartridge devices may include, for example, a two- or multi-component mortar composition, wherein a curable resin component is arranged in a chamber or cartridge of the cartridge device and a curing component is arranged in a further chamber or cartridge of the cartridge device disposed thereof in a reaction-inhibiting manner. Cartridge devices with such two-component mortar compositions are used, for example, as an injection mortar for the chemical anchoring, for example, of metal elements in mineral substrates, such as in particular buildings made of brick, concrete or natural stone. In this case, first the boreholes which are correspondingly required to attach the anchoring means are introduced into the mineral substrate, after which the curable resin component is mixed with the curing component of the two-component mortar composition and introduced into the borehole, whereupon the anchoring means to be fastened is introduced and adjusted, after which the mortar compound is cured.

The typical structure of such an extrusion device provides extrusion pistons arranged on a push rod which can each move a plunger in a feed direction in the direction of the output opening of the respective cartridge or chamber of the cartridge device. Each plunger interacts with a respective cartridge and presses the contents of the respective cartridge in the direction of the output opening. The push rod is driven by a common drive mechanism.

For different formulations of two-component mortar compounds, different mixing ratios of the components in the individual cartridges of the cartridge device are required. Usually, this is achieved by the extrusion of cartridges with identical drive speed and different diameters.

In order to ensure error-free operation, it is necessary for the cartridge device used in each case to be matched to the extrusion device and for the extrusion device to be operated in an operating mode which is matched to the cartridge device used. When using non-matched combinations of cartridge device and extrusion unit, it can result, on the one hand, in damage to the cartridge device or damage to the extrusion device or, on the other hand, it can result in an unwanted mixing ratio between the components located in the cartridges for the currently used cartridge device.

SUMMARY OF THE INVENTION

It is the object of the invention to provide a method for operating an extrusion system which can be operated at different feed rates of the extrusion pistons and an extrusion system for carrying out such a method, with which methods a simple and reliable way of preventing damage to the inserted cartridge device and/or the extrusion device used, as well as a desired mixing ratio between components present in the cartridges is achieved in a simple manner.

This object is achieved with a method for operating an extrusion system comprising an extrusion device and a cartridge device. The cartridge device is configured having at least two cartridges and two separate chambers and the extrusion unit is designed having a receiving space for receiving the cartridge device, an extrusion device having an extrusion piston which is operable at at least two different extrusion speeds, each extrusion piston being designed to cooperate with a cartridge, a control device, at least one drive device, and a power supply. The object is achieved in that the method comprises the following steps:

Inserting the cartridge device into the receiving space;
Emitting at least a first signal from a signal generator of the cartridge device;
Receiving the at least one signal of the cartridge device by means of at least one sensor of the extrusion unit;
Sending a second signal from the sensor to the control device;
Storing a ratio of feed rates of the extrusion pistons in a storage device of the control device in dependence on the second signal;
Actuating the at least one drive device by the control device for displacing the two extrusion pistons into a start position, in which a plunger of the first extrusion piston substantially abuts the first cartridge of the cartridge device and a plunger of the second extrusion piston substantially abuts the second cartridge of the cartridge device; and
Actuating the at least one drive device by the control device with a ratio of feed rates stored in the storage device of the control device for the extrusion piston at user request.

DETAILED DESCRIPTION OF THE INVENTION

Figure 1:
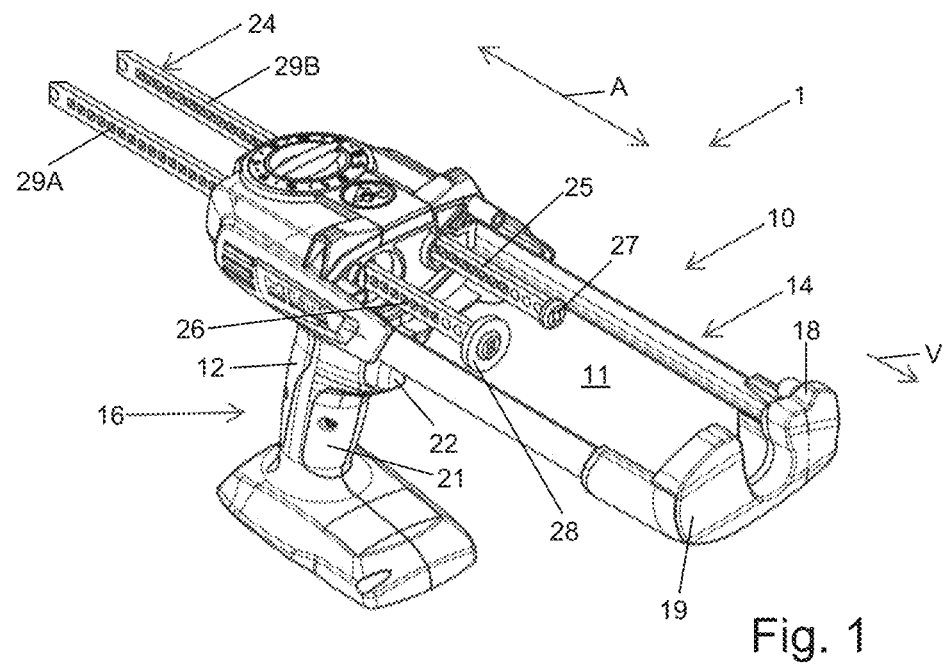
FIG. 1 shows a simplified three-dimensional representation of an extrusion device of an extrusion system.

With the extrusion system according to the invention, it can be ensured in a simple manner that, when the user selects or activates an actuating switch provided for this purpose on the extrusion device, the extrusion pistons are operated by a user with a ratio of feed ratios for the extrusion pistons, which is matched to the cartridge device used, and thereby a desired mixing ratio is achieved between the compounds present in the cartridges. Furthermore, with the method according to the invention, the risk of damaging the cartridge device and/or the extrusion device is reliably prevented, since it is ensured by the method according to the invention that the positioning of the extrusion pistons in the start position and the actuation of the extrusion pistons is matched with the respective cartridge device used when requested by the user. Furthermore, the effects of user-side misconduct on the functionality of the cartridge device and/or the extrusion device can be reduced or prevented. In addition, it can be easily recognized whether a compatible extrusion exists, i.e. whether the cartridge device is suitable for use in the extrusion device. This also reduces the risk of damage to the cartridge device used and/or the extrusion unit.

With the proposed method, different mixing ratios of the components in the individual cartridges of the cartridge device can be realized by different drive speeds of the two or more feed rods. As a result, different mixing ratios of components contained in the cartridges or chambers can be achieved even when using identical cartridge devices. This reduces both the cost of the cartridge devices and simplifies the application.

By means of the method according to the invention, a desired mixing ratio of materials located in the cartridges or chambers of the cartridge device can be set in a simple manner. The mixing ratio obtained results in dependence on cross sections, in particular diameters of the respective cartridges or chambers in connection with a ratio of the respective feed rates of the extrusion pistons. The cartridges may have a different cross-section, in particular a different diameter. In particular, it can be provided that the cartridges have a length ratio in the feed direction of the extrusion pistons, which essentially corresponds to the ratio of the feed rates of the extrusion pistons. This ensures that both cartridges are essentially empty at the same time.

In order to achieve different mixing ratios of the components in the cartridges of a cartridge device, different types of cartridge devices can be inserted into the receiving space of the extrusion device. Cartridge devices which can be inserted into the receiving space of the extrusion device each have at least two cartridges, of which one cartridge has a first cross section and another cartridge has a second cross section. Different cartridge devices differ in particular only with regard to the length of the individual cartridges in the feed direction of the extrusion pistons. By means of an appropriate choice of length ratios of the cartridges, it is possible to achieve, in a simple manner at a desired mixing ratio, that both cartridges are used up in a substantially simultaneous manner.

If a cartridge of all inserted cartridge devices has a fixed length in the feed direction of the extrusion piston, in an advantageous embodiment of the method according to the invention, the control device can easily determine the starting position of the respective extrusion piston from the ratio of feed rates of the extrusion pistons stored in the storage device.

An advantageous embodiment is characterized by the emission of at least one third signal from the signal generator of the cartridge device, which stores a starting position of the respective extrusion pistons in the storage device. As a result, the pistons of the extrusion pistons can be automatically brought into the respective start position by a corresponding activation of the at least one drive device.

It can be provided that at least a fourth signal is emitted by the signal generator of the cartridge device, which sets the drive device in a deactivation state, i.e. the drive device is set in this state or remains in this state, when the fourth signal exceeds a threshold stored in the control device or is outside a predetermined range. As a result, for example, a displacement of the extrusion pistons upon user-side request can be prevented in a simple manner if an expiration date of the cartridge device is exceeded or if an allowable temperature range stored on the cartridge device is not present.

In a preferred embodiment, a warning signal is emitted by a warning signal generator if the second signal does not correspond to a value stored in the control device. The user can thereby be notified, for example, in an acoustic, visual or haptic manner, if a cartridge device that is not compatible with the extrusion device is present or if a mixing ratio required by the cartridge device cannot be implemented by the extrusion device.

Additionally or alternatively, such a warning signal can be sent out by a warning signal generator if the drive device is set by the fourth signal in the deactivation state and/or the fourth signal exceeds a threshold stored in the control device.

Furthermore, an extrusion system for performing such a method is proposed, wherein the extrusion system is designed having an extrusion unit and a cartridge device which extrusion unit is configured having at least two cartridges and the extrusion unit is designed having a receiving space for receiving the cartridge device, an extrusion device having an extrusion piston operable at at least two different extrusion speeds, each extrusion piston being designed to cooperate with a cartridge, a control device, at least one drive device, and a power supply.

With the extrusion system according to the invention, it can be ensured in a simple manner that, when the user selects or activates an actuating switch provided for this purpose on the extrusion device, the extrusion pistons are operated by a user with a ratio of feed ratios for the extrusion pistons, which is matched to the cartridge device used. As a result, the risk of damage to the cartridge device and/or the extrusion device is reliably eliminated. Furthermore, if appropriate, the effects of user-side misconduct on the functionality of the cartridge device and/or the extrusion device can be reduced or prevented. In addition, it can be easily recognized whether a compatible extrusion exists, i.e. whether the cartridge device is suitable for use in the extrusion device. This also reduces the risk of damage to the cartridge device used and/or the extrusion unit.

In order to implement a signal transmission between the cartridge device and the extrusion device in a structurally simple manner, a wireless transmission device may be provided with a signal transmitter assigned to the cartridge device and at least one sensor associated with the extrusion device. By means of the transmission device, a signal transmission from the cartridge device to the extrusion device is possible and an extrusion process can thereby be optimized with regard to the respectively used cartridge device.

In a preferred embodiment, the wireless transmission device is an optical transmission device or a radio transmission device. The transmission device can be based on different operating principles and/or standards. The mode of operation of the transmission device can be based on signal transmission in the radio frequency range, for example by means of ultra-short wave, short wave or medium wave frequency, as well as on signal transmission in the infrared or optical frequency range. In particular, the transmission device is configured as an RFID transmission device, as a Bluetooth transmission device, as an NFC transmission device, as a WiFi transmission device, as a QR transmission device, or as a DMC transmission device. Furthermore, the transmission device can be embodied as a WLAN transmission device, as a ZigBee transmission device, as a Wibree transmission device, as a WiMAX transmission device, as an IrDA transmission device or as a transmission device operating on optical directional radio.

A transmission of the signal emitted by the cartridge device and received by the at least one sensor signal to the controller is achieved in a simple design to be implemented by providing a further transmission device between the at least one sensor and the control device, wherein the transmission device is designed to be wired or wireless.

The further transmission device can in principle be designed to be comparable to the transmission device and be designed, for example, as an RFID transmission device, as a Bluetooth transmission device, as an NFC transmission device, as a WiFi transmission device, as a QR transmission device, or as a DMC transmission device. Furthermore, the transmission device can be embodied as a WLAN transmission device, as a ZigBee transmission device, as a Wibree transmission device, as a WiMAX transmission device, as an IrDA transmission device or as a transmission device operating on optical directional radio.

In order to be able to achieve an interaction with a user in a structurally simple manner, in an advantageous embodiment, an output device is provided on a housing of the extrusion device. The output device can be designed, for example, as a warning device, which is designed to output optical, acoustic and/or haptic signals. The output device may in this case comprise a display device arranged on the extrusion device, for example, preferably in the form of a display. Alternatively or additionally, it can be provided that the output device is part of a transmission device, which is designed, for example, for wireless connection to a separate display device, for example a mobile radio device or a smartphone.

In an advantageous embodiment, the extrusion device has at least one readable storage device designed to store the first signal, the second signal, the third signal and/or the fourth signal at least temporarily. The storage device is preferably readable by means of an output device, such that data stored on the storage device can be evaluated.

In order to achieve different ratios of feed rates of the two extrusion pistons in a simple manner, a transmission device is provided, which is designed for setting different ratios of feed rates of the first extrusion piston to the second extrusion piston, wherein the extrusion piston can be actuated by a common drive device. By allowing the implementation of the different ratios of feed ratios by means of a single drive means, a cheaply implementable extrusion system is created.

In an alternative embodiment, two drive means are provided, wherein a first drive means is designed for actuating the first extrusion piston and a second drive means is designed for actuating the second extrusion piston. As a result, a particularly accurate and stepless adjustment of a ratio of feed rates between the first extrusion piston and the second extrusion piston is achieved.

Further advantages can be found in the following description of the drawings. In the figures, an embodiment of the present invention is shown. The drawings, the description and the claims contain numerous features in combination. The person skilled in the art can advantageously examine the features in detail and evolve even additional combinations.

In the drawings, identical and equivalent components are provided with the same reference numerals.

Figure 2:
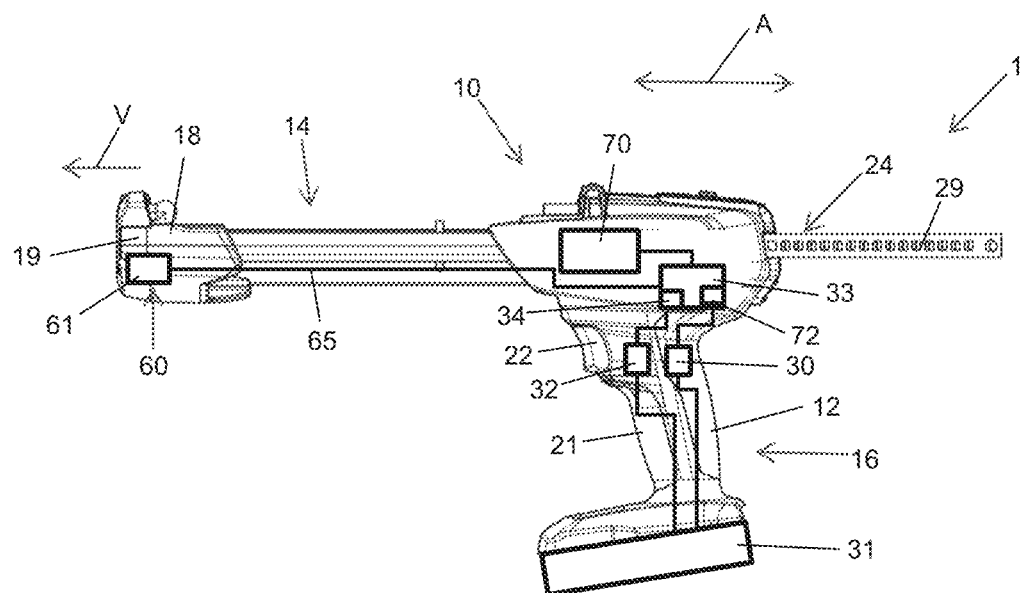
FIG. 2 shows a simplified side view of the extrusion unit of the extrusion system according to FIG. 1.

In the drawings:

FIG. 1 shows a simplified three-dimensional representation of an extrusion device of an extrusion system;

FIG. 2 shows a simplified side view of the extrusion unit of the extrusion system according to FIG. 1

Figure 3:
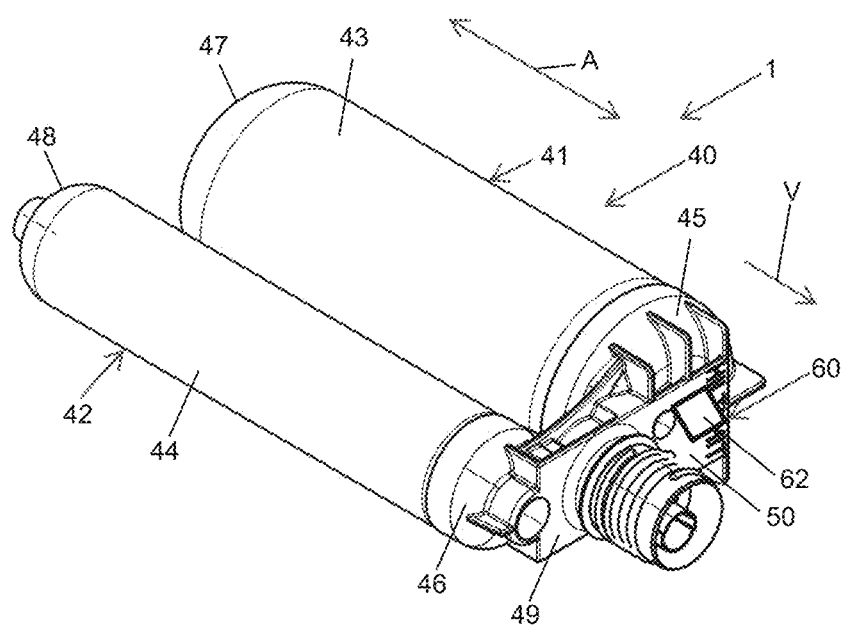
FIG. 3 shows a three-dimensional view of a cartridge device of the extrusion system designed to cooperate with the extrusion device according to FIGS. 1 and 2, wherein the cartridge device is designed having two cartridges.
Figure 4:
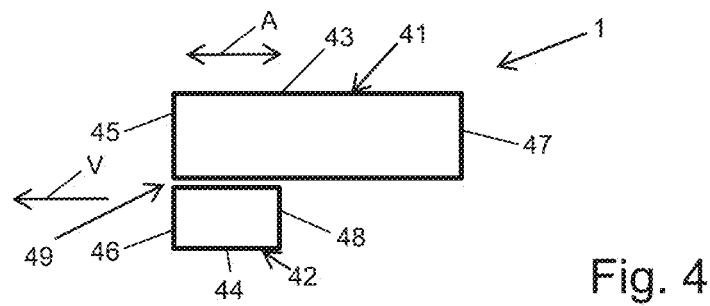
FIG. 4 shows a schematic representation of the extrusion device according to FIG. 1 and FIG. 2, wherein a cartridge device is arranged in a receiving space of the extrusion device.
Figure 5:
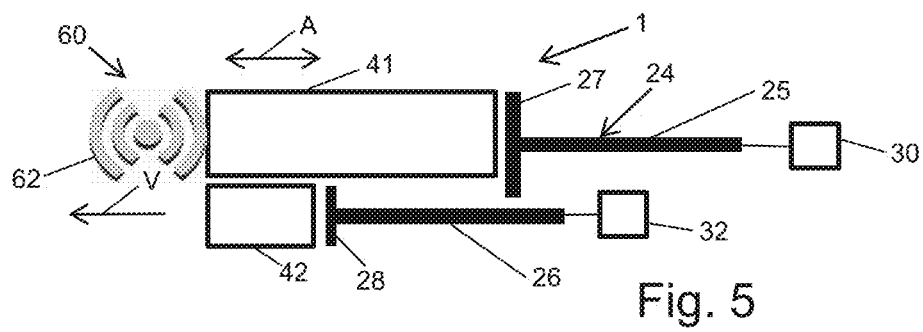
FIG. 5 shows a view corresponding to FIG. 4 of the extrusion system, wherein the extrusion pistons of the extrusion device are displaced into a starting position.
Figure 6:
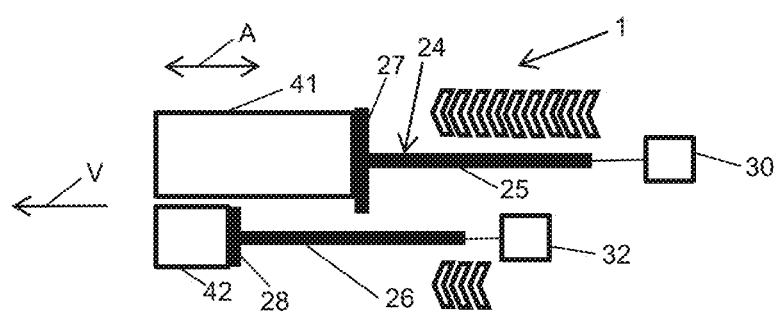
FIG. 6 shows a view corresponding to FIGS. 4 and 5 of the extrusion system during user-actuated operation of the extrusion device.
Figure 7:
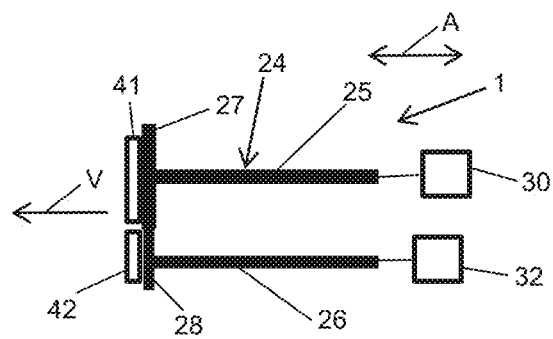
FIG. 7 shows a view corresponding to FIGS. 4 to 6 of the extrusion system after a substantially complete emptying of cartridges of the cartridge device.
Figure 8:
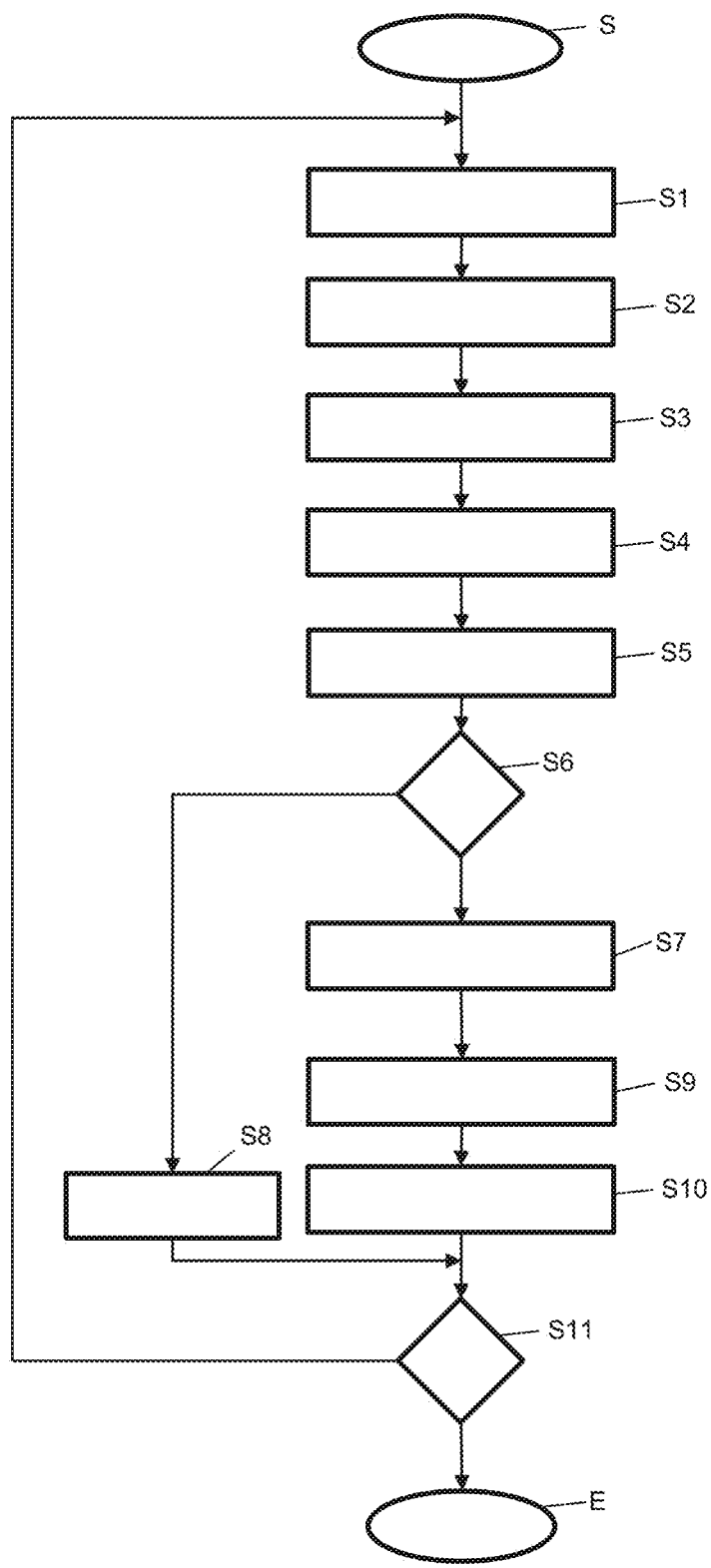
FIG. 8 shows a simplified representation of a flow chart of an embodiment of a method according to the invention for operating the extrusion system according to FIGS. 1 to 7.

FIG. 3 shows a three-dimensional view of a cartridge device of the extrusion system designed to cooperate with the extrusion device according to FIGS. 1 and 2, wherein the cartridge device is designed having two cartridges;

FIG. 4 shows a schematic representation of the extrusion device according to FIG. 1 and FIG. 2, wherein a cartridge device is arranged in a receiving space of the extrusion device;

FIG. 5 shows a view corresponding to FIG. 4 of the extrusion system, wherein the extrusion pistons of the extrusion device are displaced into a starting position;

FIG. 6 shows a view corresponding to FIGS. 4 and 5 of the extrusion system during user-actuated operation of the extrusion device;

FIG. 7 shows a view corresponding to FIGS. 4 to 6 of the extrusion system after a substantially complete emptying of cartridges of the cartridge device; and FIG. 8 shows a simplified representation of a flow chart of an embodiment of a method according to the invention for operating the extrusion system according to FIGS. 1 to 7.

EXEMPLARY EMBODIMENT

A preferred embodiment of an extrusion system 1 according to the invention is shown in FIGS. 1 to 7, wherein in FIG. 1 and FIG. 2, an extrusion device 10 of the extrusion system 1 and in FIG. 2 a cartridge device 40 of the extrusion system 1 are shown.

In the present case, the extrusion device 10 is designed for extruding multicomponent compounds, wherein the compounds can be provided, for example, for filling, gluing or sealing or similar applications in the construction sector.

In the present case, the extrusion device 10 is designed to cooperate with a cartridge device 40 shown in FIG. 3, which has two containers designed as cartridges 41 and 42. The cartridge device 40 can be arranged in a receiving space 11 of a housing 12 of the dispensing device 10 and, for example, can include a two-component mortar compound. In this case, a curable resin component can be arranged in a chamber or cartridge 41 of the cartridge device 40 and a hardener component can be arranged in the further chamber or cartridge 42 of the cartridge device 40, which is arranged separately from the latter to inhibit the reaction. The compound resulting after mixing of the curable resin component and the curing component is used for example as an injection mortar for the chemical anchoring, for example of metal elements in mineral substrates, such as in particular buildings made of brick, concrete or natural stone. In this case, first the boreholes which are correspondingly required to attach the anchoring means are introduced into the mineral substrate, after which the curable resin component is mixed with the curing component of the two-component mortar composition and introduced into the borehole, whereupon the anchoring means to be fastened is introduced and adjusted, and the mortar mass is then cured.

In the present case, the housing 12 of the extrusion device 10 extends substantially along an axial direction A and has a functional section 14 and a handling section 16. The functional section 14 substantially includes the receiving space 11 and, at a processing-side distal end 18 of the functional section 14, a machining head 19, which is penetrated by an extrusion opening (not shown in detail) of the cartridges 41, 42. Compounds output from the cartridges 41, 42 are mixed, in particular, in a mixing region 49 of the cartridge device 40 and are delivered at the processing-side distal end 18 of the functional section 14 to a location to be processed.

The handling section 16 of the housing 12 has, in addition to a handle 21, an actuating switch 22 arranged in the region of the handle 21, which actuating switch may be embodied for example as a so-called MOSFET switch. For the extrusion of the cartridges 41, 42, an extrusion device 24 is provided, which in the present case is designed with two extrusion pistons 25, 26, which in the present case are firmly connected respectively to a push rod 29A or 29B. The extrusion pistons 25, 26 each have a plunger 27 and 28 at the end thereof facing the cartridge 41 and 42.

Furthermore, there are two drive devices, in particular designed as electric motors 30 and 32 and shown in a highly schematic form in FIGS. 5 to 7, wherein the electric motor 30 is designed for displacing the extrusion piston 25 by means of the push rod 29A in the axial direction A and the electric motor 32 is designed for displacing the extrusion piston 26 by means of the push rod 29 B in the axial direction A. In order to output compounds present in the cartridges 41, 42 via the extrusion openings from the cartridges 41, 42, the extrusion pistons 25, 26 can be individually controlled in the direction of the distal end 18 by means of the push rods 29A and 29B which can be driven by the electric motors 30, 32 in a feed direction V.

The electric motors 30 and 32 are in the present case supplied with energy by a power supply 31 designed as an accumulator. Alternatively, the extrusion device 10 may also be line-operated, wherein a plug that can be coupled to a power supply system can be provided. The extrusion device 10 further comprises a control device 33, which is designed to actuate the electric motors 30 and 32 according to a user request by means of the actuating switch 22.

The electric motors 30, 32 can be put into different operating modes by the control device 33, wherein a deactivation mode is provided, in which no current is fed from the accumulator 31 to the electric motors 30, 32 and an actuation of the actuating switch 22 does not lead to a displacement of the push rods 29A and 29B. The electric motors 30, 32 are further displaceable into an operating mode in which a user-side actuation of the actuating switch 22 leads to a displacement of the extrusion pistons 25 and 26 in the feed direction V at a respectively adapted speed.

The cartridges 41, 42 of the cartridge device 40 in the present case each have a substantially cylindrical base body 43 or 44 having a first end wall 45 or 46 and an opposite second end wall 47 and 48, respectively. At the first end wall 45 and 46, an output opening is provided in each case, which openings are connected to each other via the mixing region 49. For example, an output device in the form of a socket can be connected to the mixing region 49. The second end wall 47 and 48 is designed to cooperate with the plunger 27 and 28 of the respective extrusion piston 25 and 26, wherein at a displacement of the extrusion piston 25 and 26 in the feed direction V in the direction of the first end wall 45 and 46, a volume of the main body 43 or 44 of the respective cartridge 41 or 42 is reduced, so that the respective compound in the cartridges 41 and 42 is output by the output opening, mixed in the mixing region 49 and extruded by means of the output device.

The extrusion system 1 furthermore has a transmitting device 60 which has at least one sensor 61 arranged on the extrusion device 10 and a signal generator 62 arranged on the cartridge device 40. The transmission device 60 is wireless and can work by means of various transmission principles. In particular, it is an RFID transmission device, but may alternatively be configured, for example, as an RFID transmission device, as a Bluetooth transmission device, as an NFC transmission device, as a WiFi transmission device, as a QR transmission device, or as a DMC transmission, as a WLAN transmission device, as a ZigBee transmission device, as a Wibree transmission device, WiMAX transmission device, as a IrDA transmission device or a transmission device operating according to optical directional radio communication.

In the present case, the signal transmitter 62 is arranged on an end face 50 of the mixing region 49 of the cartridge device 40, whereas the sensor 61 is arranged on the housing 12 of the extrusion device 10 in such a way that the signal transmitter 62 of the cartridge device 40 can interact in a prescribed manner with the sensor 61, when the cartridge device 40 is arranged in the receiving space 11, and signals can be transmitted from the signal generator 62 to the sensor 61. For this purpose, the sensor 61 is arranged, for example, in the region of a wall of the housing 12 delimiting a distal end region of the receiving region 11.

The sensor 61 is coupled to the control device 33 by means of a further transmission device 65, wherein the further transmission device 65 may be wireless or wired. The further transmission device 65 may be embodied on the basis of the same transmission mechanisms as the transmission device 60.

The cartridges 41 and 42 of the cartridge device 40 according to FIG. 2 each have a substantially identical length in the axial direction A. A desired mixing ratio between the compounds contained in the cartridges 41 and 42 is in this case achieved by an actuation of the extrusion pistons 25 and 26 by the respective electric motor 30 or 32 at a substantially identical speed.

The cartridges 41 and 42 of the cartridge device 40 according to FIG. 4 to FIG. 7 have a different length in the axial direction A, wherein the first cartridge 41 according to FIG. 4 is designed to be longer in the axial direction A than the second cartridge 42. In the example shown, the first cartridge 41 is three times as long in the axial direction A as the second cartridge 42, for example. In order to achieve a desired mixing ratio between the compounds located in the first cartridge 41 and in the second cartridge 42, the first cartridge 41 is in this case to be actuated at a feed rate of the first extrusion piston 25 that is three times greater than the extrusion piston 26 of the second cartridge 42.

In FIG. 5, the extrusion pistons 25, 26 are moved each into a starting position, wherein the plunger 27 of the first extrusion piston 25 substantially abuts the first cartridge 41 of the cartridge device 40 and the plunger 28 of the second extrusion piston 26 substantially abuts the second cartridge 42 of the cartridge device 40.

FIG. 6 schematically shows a state of the extrusion system 1 during an application-side actuation of the actuating switch 22 in which the extrusion piston 25 acts upon the first cartridge 41 at a feed rate of three times the feed rate at which the extrusion piston 26 acts upon the second cartridge 42. The ratio of the feed rates of the extrusion pistons 25 and 26 corresponds to a ratio of the lengths of the cartridges 41 and 42.

FIG. 7 shows the extrusion pistons 25 and 26, respectively, in a completely extended position, in which both the first cartridge 41 and the second cartridge 42 are substantially completely extruded.

FIG. 8 shows an embodiment of a method according to the invention for operating the extrusion system 1, wherein, in particular, an operation of the extrusion pistons 25 and 26 matched with the currently used cartridge device 40 is adjustable by means of the method. In this case, a misadjustment with a possible damage of both the extrusion device 10 and the cartridge device 40 can be reliably prevented.

The method begins with the start S. In step S1, the cartridge device 40 is inserted into the receiving space 11. In step S2, the signal generator 62 of the cartridge device 40 sends out a first signal, which specifies the cartridge device 40 in particular with regard to the length of the individual cartridges 41 and 42. Furthermore, in the present case, the cartridge device 40 additionally transmits a third signal and a fourth signal, the third signal specifying a start position of the respective extrusion pistons 25 and 26. The fourth signal includes, for example, a durability date of the cartridge device 40, an allowable temperature range of surrounding area for processing, or the like. The signals emitted by the cartridge device 40 are received by the sensor 61 of the dispenser 10 in step S3, wherein the cartridge device 40 is arranged in a prescribed manner in the receiving space 11.

Then, in step S4, second signals corresponding to the first signal, the third signal, and the fourth signal, and generated from the first signal, the third signal, and the fourth signal, respectively, are sent from the sensor 61 to the control device 33, In the subsequent step 35, a ratio of feed rates for the extrusion pistons 25 and 26 transmitted in the first signal is stored in a storage device 34 of the control device 33. Likewise, the starting positions for the extrusion pistons 25 and 26 transmitted with the third signal are stored in the storage device 34 in the present case.

In query step S6, the second signal correlating with the fourth signal is compared, for example, with a current ambient temperature detected by a temperature sensor, and in the event that the current ambient temperature is within a permissible temperature range for the cartridge device 40, step S7 is continued. Alternatively or additionally, it can be compared in the query step 35 whether the current date is prior to the allowable expiration date of the cartridge device 40. If the result is positive, query step S7 is continued.

In the case of a negative query result in the query step S6, the electric motors 30 and 32 are set by the control device 33 in the deactivation mode in step 38, so that an actuation of the actuating switch 22 does not lead to a displacement of the push rods 29A and 29B and thus the extrusion pistons 25 and 26.

After a positive query result in the query step S6, the electric motors 30, 32 control the controller 33 in step S8, such that they are moved to the starting positions stored in the storage device 34 in which starting positions each plunger 27 and 28 substantially abuts the cartridge 41 and 42. Subsequently, the electric motors 30 and 32 are respectively switched to the operation mode by the control device 33 in step S9. A subsequent user-side actuation of the actuating switch 22 leads to the displacement of the extrusion pistons 25, 26 by the electric motors 30, 32 in step S10.

In the query step 311 following the steps S8 and S10, a query is made as to whether relevant framework conditions to be defined have changed to a predetermined extent. If the query result is positive, the method is continued in step S1. If the query result is negative, the procedure in step E is ended.

By means of the method for operating the extrusion system 1, it is possible in a simple manner to ensure that the cartridge device 40 used in each case is extruded by means of the extrusion device 10 at the intended feed rates of the extrusion pistons 25 and 26 and a desired mixing ratio of the compounds present in the cartridges 41 and 42 is achieved. Furthermore, damage to both the dispenser 10 and the cartridge device 40 is prevented, which could occur in conventional extrusion systems, for example, by improperly setting a ratio of feed rates of the extrusion pistons. In addition, by transmitting corresponding data from the cartridge device 40 to the extrusion device 10, it is possible in a simple manner to prevent the cartridge device 40 from being used in framework conditions that can be defined as impermissible which can lead to undesired processing results. Damage to the cartridge device 40 and/or the extrusion unit 10 by a cartridge device 40 which is incorrectly arranged in the receiving space can also be prevented when the signal generator 62 and the sensor 61 are designed and arranged such that a signal transmission between the signal generator 62 and the sensor 61 only takes place when the cartridge device 40 is arranged to the prescribed extent in the receiving space 11.

The extrusion device 10 has, in particular, an output device 70, which is designed, for example, for outputting a warning signal in an optical, acoustic and/or haptic manner, when the electric motors 30 and 32 are switched by the control device 33 into the operating mode in step S9. The control device 33 can also have a further storage device 72, which is designed for at least temporarily storing the first signal, the second signal, the third signal and/or the fourth signal, and which can be read out via an output device. In this way, utilization information of the extrusion system 1 can be evaluated in a simple manner.

LIST OF REFERENCE NUMERALS 1 extrusion system
10 extrusion unit
11 receiving space
12 housing
14 functional section
16 handling section
18 distal end
19 machining head
21 gripping handle
22 actuating switch
24 extrusion device
25 extrusion piston
26 extrusion piston
27 plunger
28 plunger
29A push rod
29B push rod 30 drive device; electric motor
31 energy supply; accumulator
32 drive device; electric motor
33 control device
34 storage device
40 cartridge device
41 first cartridge
42 second cartridge
43 main body
44 main body
45 first end wall
46 first end wall
47 second end wall
48 second end wall
49 mixing area
50 front side
60 transmission device
61 sensor
62 signal generator
65 further transmission device
70 output device
72 further storage device
A axial direction
V feed direction

The invention claimed is:

1. A method for operating an extrusion system comprising an extrusion unit that includes an extrusion device and a cartridge device, wherein the cartridge device is configured to have at least two cartridges and the extrusion unit is designed to have a receiving space for receiving the cartridge device, wherein the extrusion device has extrusion pistons operable at at least two different extrusion speeds, each of the extrusion pistons being designed to cooperate with the at least two cartridges, a control device, at least one drive device, and a power supply, the method comprises:
   inserting the cartridge device into the receiving space;
   emitting at least one first signal from a signal generator of the cartridge device;
   receiving the at least one first signal of the cartridge device by at least one sensor of the extrusion device;
   sending a second signal from the sensor to the control device;
   storing a ratio of feed rates of the extrusion pistons in a storage device of the control device as a function of the second signal;
   actuating the at least one drive device by the control device for displacing the extrusion pistons into a starting position, in which a first plunger of a first of the extrusion pistons is substantially in contact with a first of the at least two cartridges of the cartridge device and in which a second plunger of a second of the extrusion pistons is substantially in contact with a second of the at least two cartridges of the cartridge device;
   actuating the at least one drive device by the control device with a ratio of feed rates stored in the storage device of the control device for the extrusion pistons at user request; and
   emitting at least one third signal from the signal transmitter of the cartridge device which stores the starting position of the extrusion pistons in the storage device.

2. The method according to claim 1, wherein the control device determines the starting position of the extrusion pistons from the ratio of feed rates of the extrusion pistons stored in the storage device.

3. The method according to claim 1, further comprising emitting at least one fourth signal from the signal generator of the cartridge device which switches at least one drive device to a deactivation state when the at least one fourth signal is greater than a threshold value stored in the control device.

4. The method according to claim 3, further comprising emitting a warning signal by a warning signal generator when the at least one drive device is set by the at least one fourth signal in the deactivation state.

5. The method according to claim 1, further comprising emitting a warning signal by a warning signal generator if the second signal does not correspond to a value stored in the control device.

6. An extrusion system for carrying out the method according to claim 1, the extrusion system comprising:
   an extrusion unit that includes an extrusion device,
   a cartridge device, wherein the cartridge device is configured to have at least two cartridges and the extrusion unit is designed to have a receiving space for receiving the cartridge device, the extrusion device having extrusion pistons operable at at least two different extrusion speeds, each of the extrusion pistons being designed to cooperate with the at least two cartridges,
   a control device,
   at least one drive device, and
   a power supply, and
   a wireless transmission device with a sensor associated with the cartridge device and at least one sensor associated with the extrusion unit; and
   wherein the at least one sensor is connected by a further transmission device to the control device, said further transmission device being designed to be wired or wireless;
   wherein the further transmission device is selected from the group consisting of an RFID transmission device, a Bluetooth transmission device, an NFC transmission device, a WiFi transmission device, a QR transmission device, a DMC transmission, a WLAN transmission device, a ZigBee transmission device, a Wibree transmission device, a WiMAX transmission device, and an IrDA transmission device operating according to optical directional radio communication.

7. The extrusion system according to claim 6, wherein the wireless transmission device is an optical transmission device or a radio transmission device, the wireless transmission device being selected from the group consisting of an RFID transmission device, a Bluetooth transmission device, an NFC transmission device, a WiFi transmission device, a QR transmission device, a DMC transmission device, a WLAN transmission device, a ZigBee transmission device, a Wibree transmission device, a WiMAX transmission device, an IrDA transmission device, and a transmission device operating according to optical directional radio communication.

8. The extrusion system according to claim 6, further comprising an output device on a housing of the extrusion unit.

9. The extrusion system according to claim 6, further comprising a transmission device that is designed for setting different ratios of feed rates of a first of the extrusion pistons to a second of the extrusion pistons, wherein the extrusion pistons can be actuated by a common drive device.

10. The extrusion system according to claim 6, further comprising two drive devices, wherein a first of the two drive devices is designed for actuating a first of the extrusion pistons and a second of the two drive devices is designed for actuating a second of the extrusion pistons.

* * * * *